US010499362B2

(12) United States Patent
Wattwood et al.

(10) Patent No.: US 10,499,362 B2
(45) Date of Patent: Dec. 3, 2019

(54) ANTENNA MONITORING SYSTEM INCLUDING CLOUD BASED SERVER COMMUNICATION VIA CELLULAR TELEPHONE TRANSCEIVER AND RELATED METHODS (71) Applicant: SUNSIGHT HOLDINGS, LLC, Maitland, FL (US)

(72) Inventors: James A. Wattwood, New Smyrna Beach, FL (US); Evan Beeton, Maitland, FL (US)

(73) Assignee: SUNSIGHT HOLDINGS, LLC, Maitland, FL (US)

( * ) Notice: Subject to any disclaimer, the term of this patent is extended or adjusted under 35 U.S.C. 154(b) by 19 days.

(21) Appl. No.: 15/790,290

(22) Filed: Oct. 23, 2017

(65) Prior Publication Data
US 2018/0132205 A1 May 10, 2018

Related U.S. Application Data (60) Provisional application No. 62/417,540, filed on Nov. 4, 2016.

(51) Int. Cl.
H04W 64/00 (2009.01)
H04L 29/08 (2006.01)
(Continued)

(52) U.S. Cl.
CPC .......... *H04W 64/006* (2013.01); *G06F 3/067* (2013.01); *G06F 3/0665* (2013.01); *H01Q 1/125* (2013.01); *H01Q 1/1242* (2013.01); *H01Q 1/18* (2013.01); *H01Q 1/246* (2013.01); *H01Q 3/02* (2013.01); *H04L 67/10* (2013.01); *H04L 67/1097* (2013.01); *H04W 88/08* (2013.01); *H04W 88/12* (2013.01)

(58) Field of Classification Search
CPC combination set(s) only.
See application file for complete search history.

(56) References Cited

U.S. PATENT DOCUMENTS 7,718,941 B2 5/2010 Austin et al.
8,299,962 B2 10/2012 Le Sage
(Continued)

FOREIGN PATENT DOCUMENTS

WO WO2008089007 7/2008

*Primary Examiner* — Junpeng Chen
(74) *Attorney, Agent, or Firm* — Allen, Dyer, Doppelt, + Gilchrist, P.A. Attorneys at Law (57) ABSTRACT An antenna monitoring system includes a cloud based server, and sensor devices, with each sensor device including a portable housing to be mounted on a respective directional antenna, and at least one alignment sensor carried by the portable housing and configured to sense alignment of the respective directional antenna. Each sensor also includes a cellular telephone transceiver carried by the portable housing, and a controller carried by the portable housing, and configured to collect alignment data from the at least one alignment sensor, and communicate with the cloud based server via the cellular telephone transceiver. The cloud based server may include a processor and a memory coupled thereto and configured to provide at least one user interface associated with the alignment data for the sensor devices.

31 Claims, 6 Drawing Sheets (51) Int. Cl.
*H04W 88/08* (2009.01)
*H04W 88/12* (2009.01)
*G06F 3/06* (2006.01)
*H01Q 1/12* (2006.01)
*H01Q 1/18* (2006.01)
*H01Q 1/24* (2006.01)
*H01Q 3/02* (2006.01)

(56) References Cited

U.S. PATENT DOCUMENTS

| | | |
|---|---|---|
| 8,471,780 B2 | 6/2013 | Dalmazzo |
| 8,766,872 B2 | 7/2014 | Dalmazzo |
| 8,766,873 B2 | 7/2014 | Dalmazzo |
| 8,935,122 B2 | 1/2015 | Stisser |
| 8,981,894 B2 | 3/2015 | Mann et al. |
| 9,046,601 B2 | 6/2015 | Le Sage |
| 2008/0012750 A1 | 1/2008 | Austin et al. |
| 2009/0141623 A1 | 6/2009 | Jung et al. |
| 2011/0140908 A1* | 6/2011 | Kosht ................ H04Q 9/00 340/870.02 |
| 2011/0199274 A1* | 8/2011 | Dalmazzo .............. G01B 21/22 343/760 |
| 2012/0319895 A1* | 12/2012 | Bruchiel ................ H01Q 1/125 342/357.36 |
| 2017/0322303 A1* | 11/2017 | Reynolds ................ G01S 19/14 |

\* cited by examiner

ANTENNA MONITORING SYSTEM INCLUDING CLOUD BASED SERVER COMMUNICATION VIA CELLULAR TELEPHONE TRANSCEIVER AND RELATED METHODS

RELATED APPLICATION

The present invention is related to U.S. Provisional Patent Application Ser. No. 62/417,540 filed Nov. 4, 2016, the entire contents of which are incorporated herein by reference.

TECHNICAL FIELD

The present embodiments are directed to the field of antennas, and more particularly, to antenna monitoring systems and related methods.

BACKGROUND

It may be desirable to have antennas aligned, not only for operation, but for increased communication efficiency. In particular, directional antennas, for increased communications efficiency, are typically aligned in multiple directions to obtain a desired coverage or communications pattern.

Present day alignment techniques may be relatively time consuming and involve using a technician on a tower and test equipment to physically adjust a given directional antenna to achieve the desired alignment. For example, a given directional antenna may be physically adjusted in any of azimuth, roll, and tilt, in an attempt to align or adjust a given directional antenna.

Over time, a given directional antenna may become out of alignment, for example, by weather, equipment aging, etc. thereby causing communications inefficiencies. Thus, it may be desirable for a given directional antenna to be periodically realigned, for example, using the techniques described above. However, this process may take a relatively large amount of time given the number of directional antennas in operation.

U.S. Pat. No. 8,766,872 to Dalmazzo is directed to an autonomous wireless antenna sensor system. More particularly, Dalmazzo discloses three subsystems: a wireless antenna sensor, a remote sensor control station, and a remote graphic user interface (GUI). Measured antenna information is transmitted from the wireless antenna sensor to the remote sensor control station at ground level. The remote sensor control station retransmits the measured antenna information to the GUI.

SUMMARY

An antenna monitoring system is for a plurality of directional antennas and may include a cloud based server, and a plurality of sensor devices. Each sensor device may include a portable housing to be mounted on a respective directional antenna, and at least one alignment sensor carried by the portable housing and configured to sense alignment of the respective directional antenna. A cellular telephone transceiver may also be carried by the portable housing. The sensor may also include a controller carried by the portable housing, and configured to collect alignment data from the at least one alignment sensor, and communicate with the cloud based server via the cellular telephone transceiver. In addition, the cloud based server may include a processor and a memory coupled thereto and may be configured to provide at least one user interface associated with the alignment data for the plurality of sensor devices. Since the sensors communicate via the cellular transceiver, the monitoring system eliminates the need for a nearby site controller with its associated spares, power, and other maintenance issues, for example.

The controller may be configured to periodically send the alignment data. The controller may also be configured to process the alignment data and send a misalignment notification based thereon.

The cloud based server may be configured to store the alignment data and permit retrieval thereof via the user interface. Alternatively or additionally, the cloud based server may be configured to forward the alignment data via the user interface. Of course, the cloud based server may be configured to process the alignment data and send a misalignment notification based thereon via the user interface. The cloud based server may be configured to provide an administrator interface for the plurality of sensor devices.

The sensor device may include at least one other sensor carried by the portable housing. Accordingly, the controller may be configured to collect other data from the at least one other sensor, and the cloud based server may be configured to provide a user interface associated with the other data for the plurality of sensor devices. The at least one other sensor may include at least one of a height sensor, a geolocation sensor, a temperature sensor, a humidity sensor, a light sensor, and a camera, for example.

The at least one alignment sensor may include at least one of a tilt sensor, a roll sensor, and an azimuth sensor. For example, the at least one alignment sensor may include at least one of an accelerometer, a microelectromechanical (MEMS) accelerometer, an optical azimuth sensor, a magnetometer, and a gyroscope.

The sensor device may also include a battery carried by the portable housing and configured to power the at least one alignment sensor, the cellular telephone transceiver, and the controller. Alternatively, the sensor device may include a supercapacitor circuit carried by the portable housing and configured to be charged by ambient RF power to thereby power the at least one alignment sensor, the cellular telephone transceiver, and the controller.

A method aspect is for monitoring a plurality of directional antennas and may include operating a plurality of sensor devices. Each sensor device may include a portable housing mounted on a respective directional antenna, at least one alignment sensor carried by the portable housing and configured to sense alignment of the respective directional antenna, a cellular telephone transceiver carried by the portable housing, and a controller carried by the portable housing. The controller may be configured to collect alignment data from the at least one alignment sensor, and communicate with the cloud based server via the cellular telephone transceiver. The method may further include operating the cloud based server that includes a processor and a memory coupled thereto to provide at least one user interface associated with the alignment data for the plurality of sensor devices.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
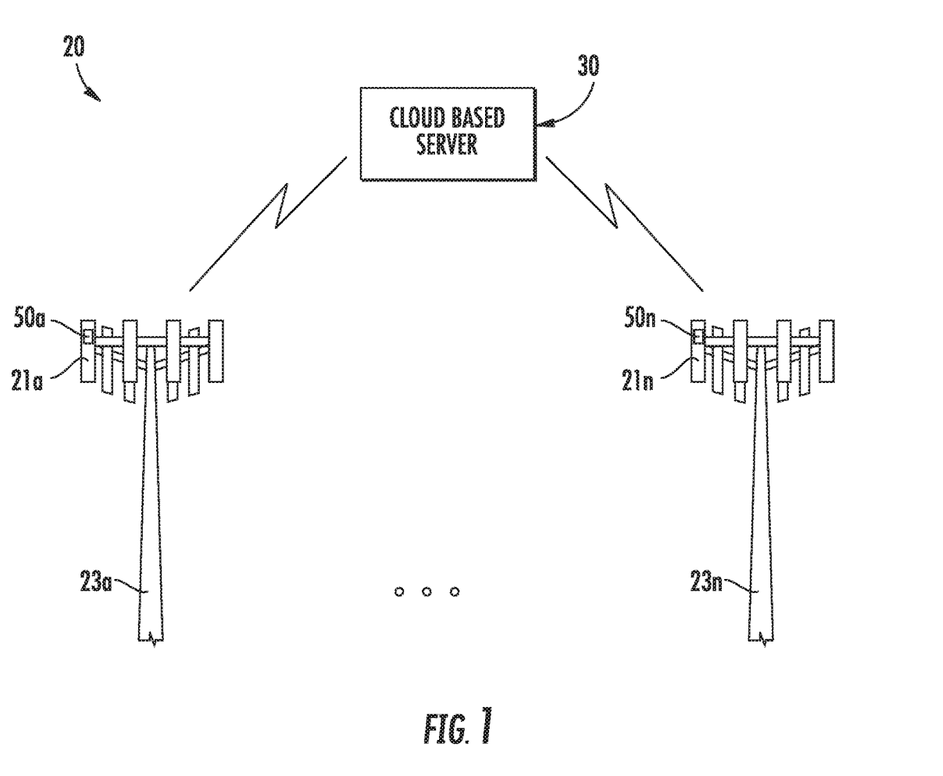
FIG. 1 is a schematic diagram of an antenna monitoring system in accordance with an embodiment.
Figure 2:
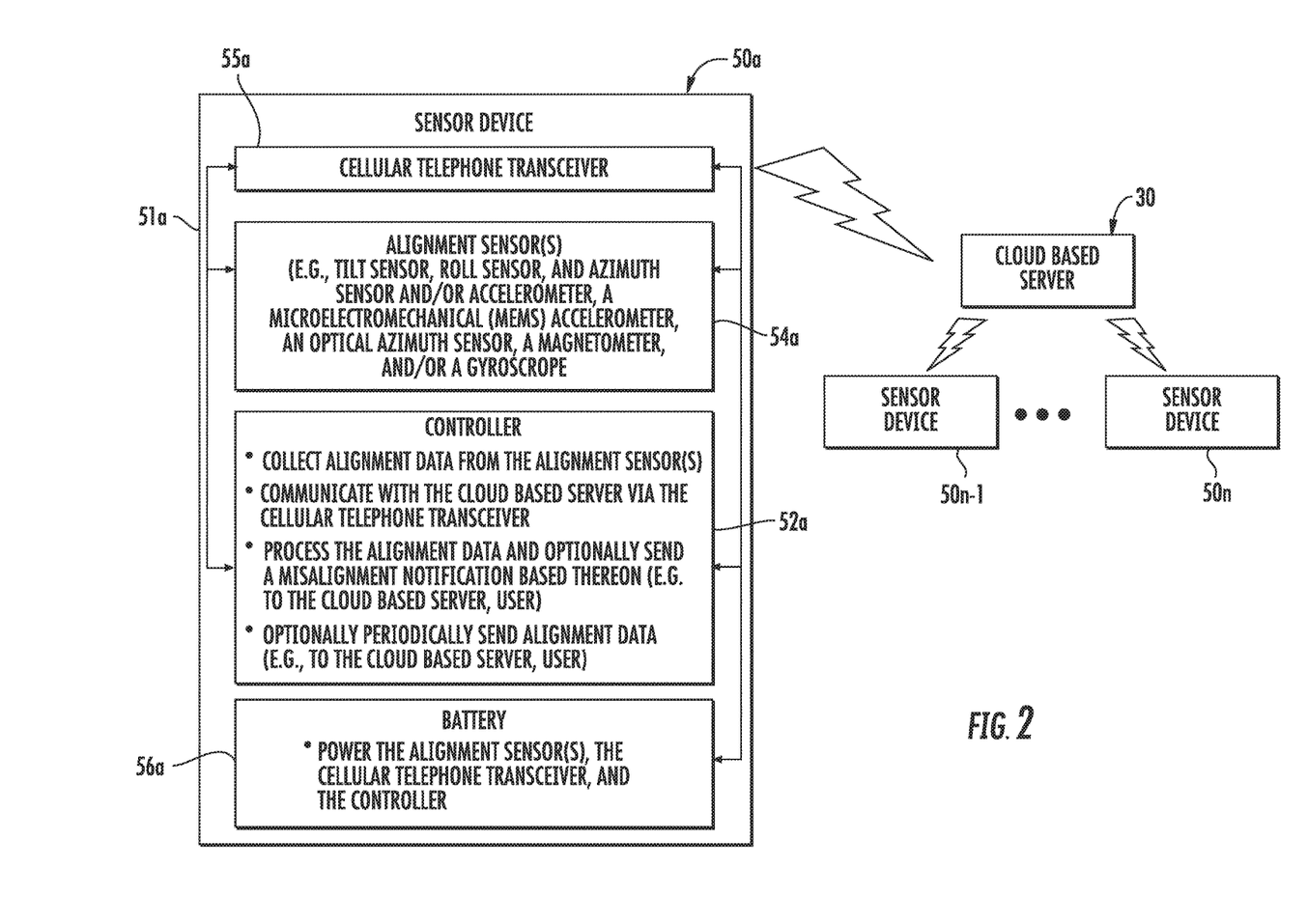
FIG. 2 is a schematic block diagram of a sensor device and cloud based server of the system of FIG. 1.

Referring initially to FIGS. 1-2, an antenna monitoring system 20 for directional antennas 21a-21n includes a cloud based server 30. The directional antennas 21a-21n may be geographically spaced apart and carried by respective towers 23a-23n, for example, and may be microwave antennas and/or cellular antennas. Of course, the directional antennas 21a-21n may be other and/or different types of antennas and may define other and/or additional types of communication links (e.g. powered, unpowered, etc.).

The antenna monitoring system 20 also includes sensor devices 50a-50n. While several sensor devices 50a-50n are illustrated in FIG. 1, it should be understood that the system 20 may include far more sensor devices, for example. Each sensor device 50a includes a portable housing 51a to be mounted on a respective directional antenna 21a, for example, to a rear or back of the respective directional antenna, and an alignment sensor 54a carried by the portable housing 51a. The alignment sensor 54a is configured to sense alignment of the respective directional antenna 21a.

The alignment sensor 54a may include a tilt sensor, a roll sensor, and an azimuth sensor, for example, for measuring tilt, roll, and azimuth, and these parameters may be used to sense the alignment of the respective directional antenna 21a as will be appreciated by those skilled in the art. The alignment sensor 54a may alternatively or additionally include an accelerometer, a microelectromechanical (MEMS) accelerometer, an optical azimuth sensor, a magnetometer, and/or a gyroscope for sensing respective parameters. With respect to an optical azimuth sensor, it will be appreciated by those skilled in the art that the optical azimuth sensor may operate in either or both of the visible and non-visible ranges. For example, an optical azimuth sensor that operates in both the visible and ultraviolet (UV) ranges (e.g., for sensing optical emissions) may be desirable for improved sensing under increased cloud coverage. Of course, each sensor device 50a may include more than one alignment sensor 54a, and/or the alignment sensor may include other types of sensors, for example, geographic position, height, etc., as will be appreciated by those skilled in the art. Each sensor device 50a also includes a cellular telephone transceiver 55a carried by the portable housing 51a.

Figure 3:
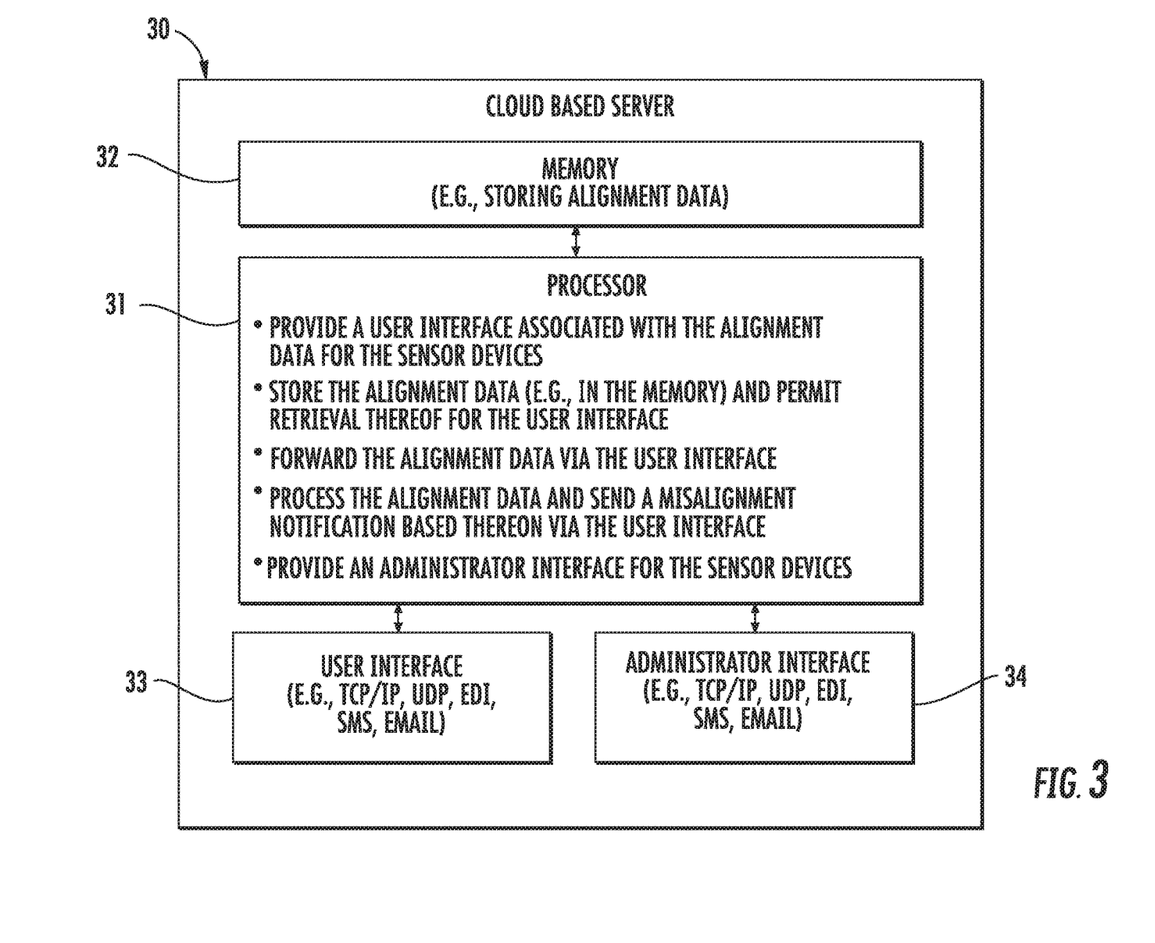
FIG. 3 is a detailed schematic block diagram of the cloud based server of FIG. 2.

Referring now additionally to FIG. 3, the cloud based server 30 includes a processor 31 and a memory 32 coupled thereto. The processor 31 is configured to provide a user interface 33 associated with the alignment data for the sensor devices 50a-50n. The user interface 33, for example, may be a physical user interface or graphical user interface (GUI) and/or may include a communications interface for remote communication and user interfacing therewith. In other words, in an embodiment, the user interface 33 may be a communications link, port, or other interface to permit data from the cloud based server 30 to be displayed, for example, on a mobile phone, tablet, computer, or other device associated with the user. The user interface 33 may communicate data and or errors using any one or more mediums and protocols, for example, web requests, TCP/IP or UDP, EDI, SMS, and email. Alternatively or additionally, the user interface 33 may provide raw measurement data. Of course, the user interface 33 may communicate using other and/or additional protocols and techniques.

Each sensor device 50a also includes a controller 52a carried by the portable housing 51a. The controller 52a is configured to collect alignment data from the alignment sensor 54a, and communicate with the cloud based server 30 via the cellular telephone transceiver 55a. In some embodiments, the controller 52a may communicate or send the alignment data to the cloud based server 30 via the cellular telephone transceiver 55a. The controller 52a may send the alignment data periodically. Alternatively, the controller 52a may send the alignment data continuously.

The controller 52a may alternatively or additionally process the alignment data and send a misalignment notification based thereon. For example, when the processed alignment data is indicative of a misalignment, the misalignment notification may be sent to the cloud based server 30 for display via the user interface 33. In some embodiments, the misalignment notification may be sent to the user without passing through the cloud based server 30. The misalignment notification may be in the form of an email, text message, or other type of protocol notification, and may be communicated to other and/or additional devices associated with a user, as will be appreciated by those skilled in the art.

Figure 4:
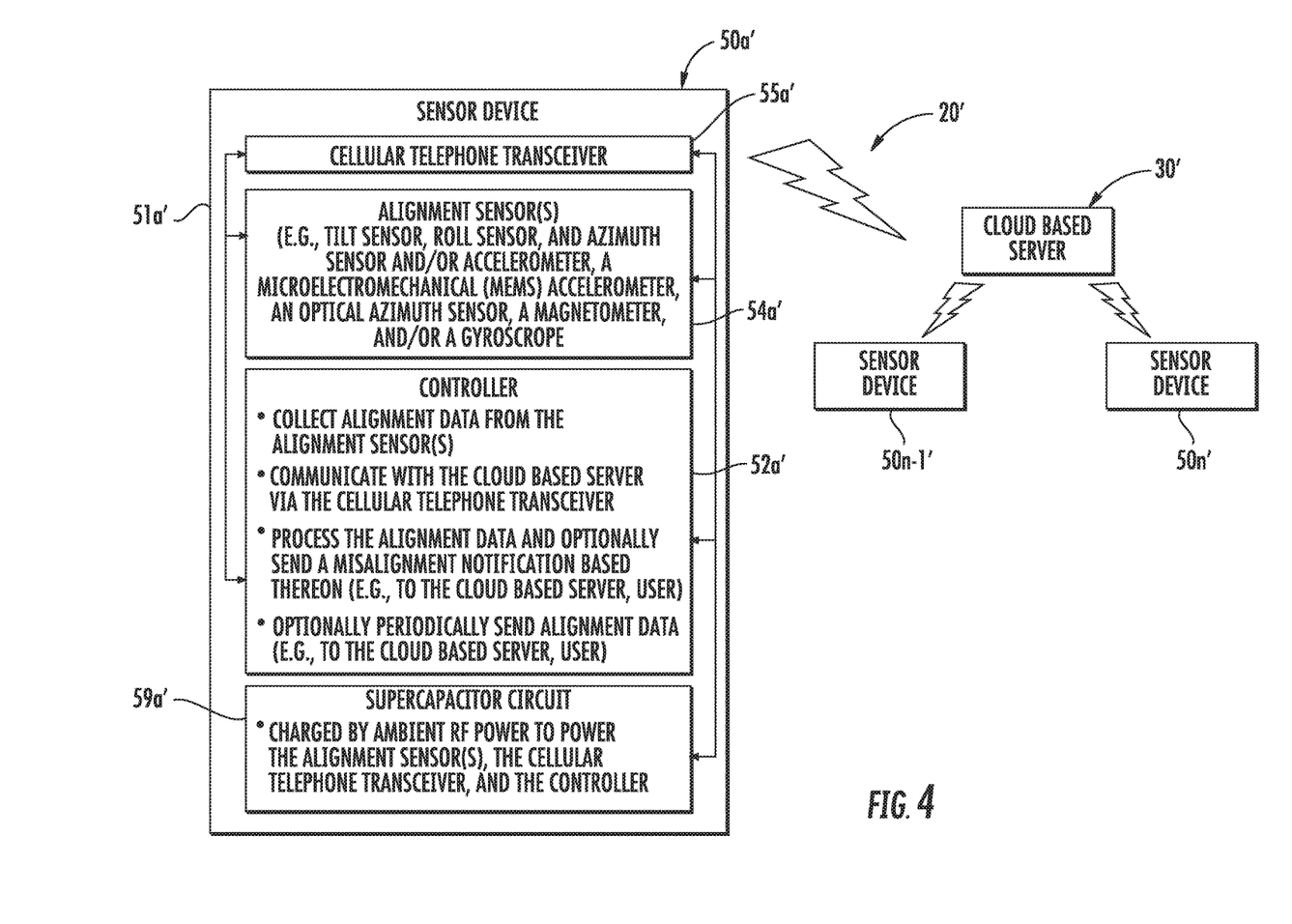
FIG. 4 is a schematic block diagram of a sensor device and cloud based server in accordance with another embodiment.

Each sensor device 50a may also include a battery 56a carried by the portable housing 51a. The battery 56a may power the alignment sensor 54a, the cellular telephone transceiver 55a, and the controller 52a. Referring briefly to FIG. 4, in some embodiments, each sensor device 50a' may be powered by a supercapacitor circuit 59a' carried by the portable housing 51a'. The supercapacitor circuit 59a' is charged by ambient RF power to thereby power the alignment sensor 54a', the cellular telephone transceiver 55a', and the controller 52a'.

The cloud based server 30, upon receipt of the alignment data, may store the alignment data and permit retrieval thereof via the user interface 33. The cloud based server 30 may also forward the alignment data via the user interface 33. For example, the processor 31 of the cloud based server 30 may generate and send an email including the alignment data. Of course, the cloud based server 30 may forward the alignment data in other and/or different formats.

Similar to the controller 52a of each sensor device 50a, the cloud based server 30 may process the alignment data and send a misalignment notification based thereon via the user interface 33. In other words, the cloud based server 30 may also send a misalignment notification either in addition to or instead of each sensor device 50a-50n. The misalignment notification may be in the form of an email, text message, or other type or protocol notification, and may be communicated to other and/or additional devices associated with a user, as will be appreciated by those skilled in the art and described above.

For example, the cloud based server 30 may transmit collected results (e.g. raw measurement data), via the user interface 33, to network operation centers or other maintenance facilities for further analysis, evaluate data for errors or values beyond pre-programmed tolerances, transmit data based on detected errors to network operations or other maintenance facilities, and receive acknowledgements of receipt of transmitted data or errors to network operation centers or maintenance facilities. The cloud based server 30 may also receive and process commands and/or raw measurement data directly (e.g., eliminating the need to access cloud based GUI) from network operations centers or other maintenance facilities. The cloud based server 30 advantageously provides a cloud based GUI for users to access for reviewing collected data, setting up data retrieval methods and frequency (e.g. a number of web requests for the latest data every X minutes), administering thresholds for determining out of bounds conditions to be reported (e.g., relatively large changes in tilt produces a notification to network operations center), commissioning, registering and decommissioning sensors in the network, grouping of sensors into logical groups for reporting and review, administering access to users and their roles, and associating business data with individual sensors (e.g., address, identification number). Of course, the cloud based server 30 may provide or perform other and/or additional functions.

The cloud based server 30 also may include or provide an administrator interface 34 for the sensor devices 50a-50n. Similarly to the user interface 33, the administrator interface 34 may communicate using any one or more mediums and protocols, for example, web requests, TCP/IP or UDP, EDI, SMS, and email. Of course, the administrator interface 34 may communicate using other and/or additional protocols and techniques. The administrator interface 34 may permit the review of collected alignment data, setting of data retrieval methods and frequency, administration of thresholds for determining out of bounds conditions to be reported (e.g., misalignments), commissioning, registering and decommissioning sensor devices, grouping of sensors into logical groups for reporting and review, administering access to users and their roles, and associating business data with individual sensors (e.g., address, identification number), for example. The administrator interface 34 may permit other and/or additional administrator functions, as will be appreciated by those skilled in the art.

As will be appreciated by those skilled in the art, the antenna monitoring system 20 may be particularly advantageous in that it eliminates the need for a further relay device. In particular, since the sensor devices 50a-50n communicate via the cellular transceiver 55a, the monitoring system 20 eliminates the need for a nearby site controller with its associated spares, power, and other maintenance issues, for example. By using the cellular transceiver 55a, for example, the monitoring system 20 may also be less geographically limited than systems that rely on WiFi, for example.

Figure 5:
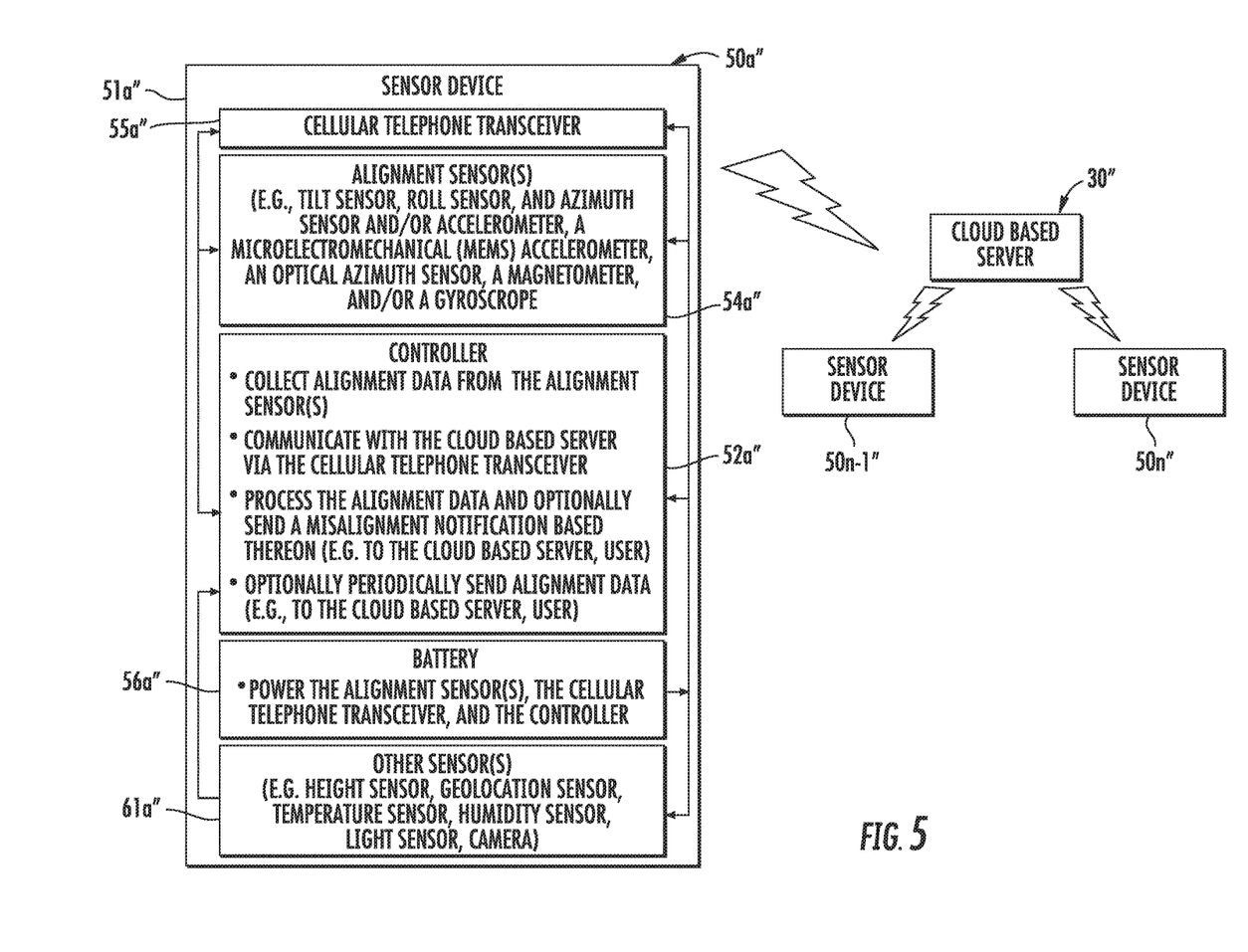
FIG. 5 is a schematic block diagram of a sensor device and cloud based server in accordance with another embodiment.
Figure 6:
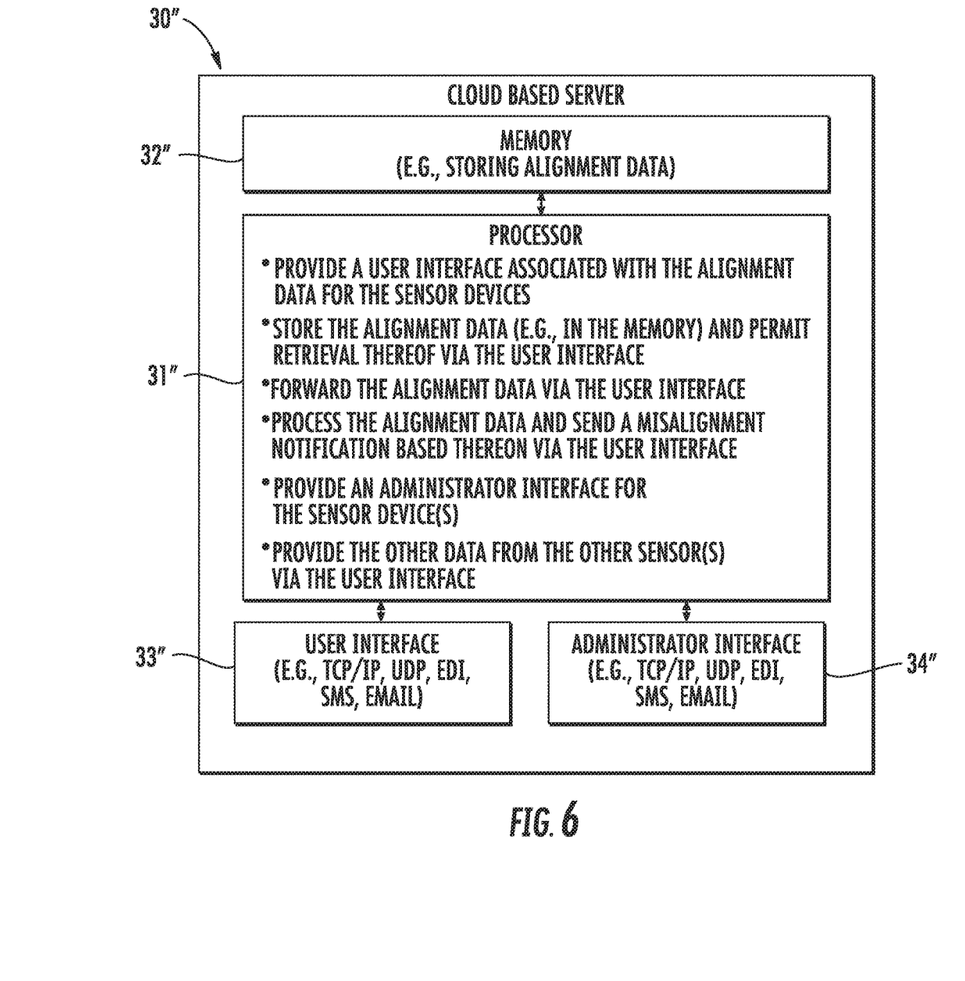
FIG. 6 is a detailed schematic block diagram of the cloud based server of FIG. 5.

Referring now to FIGS. 5-6, in another embodiment, each sensor device 50a" may include another sensor 61a" carried by the portable housing 51a". The other sensor 61a" may be a height sensor, a geolocation sensor, a temperature sensor, a humidity sensor, a light sensor, or a camera, for example. There may be more than one other sensor 61a", which may be of different types.

The controller 52a" collects other data from the other sensor 61a". The controller 52a" may communicate the other data to the cloud based server 30". The cloud based server 30" may provide the other data for the other sensor 61a" via the user interface 33".

A method aspect is directed to a method for monitoring directional antennas 21a-21n. The method includes operating sensor devices 50a-50n, each sensor including the components and functionality described above. The method also includes operating the cloud based server 30 to provide the user interface 33 associated with the alignment data for the sensor devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An antenna monitoring system for a plurality of directional antennas at a plurality of geographically spaced-apart antenna sites, the antenna monitoring system comprising:
    a cloud based server remote from the plurality of geographically spaced-apart antenna sites; and
    a plurality of sensor devices, each sensor device comprising
        a portable housing to be mounted on a respective directional antenna at a respective geographic antenna site,
        at least one alignment sensor carried by the portable housing and configured to sense alignment of the respective directional antenna at the respective geographic antenna site,
        a cellular telephone transceiver carried by the portable housing, and
        a controller carried by the portable housing, and configured to collect alignment data from the at least one alignment sensor, and communicate with the cloud based server remote from the respective geographic antenna site via the cellular telephone transceiver;
    the cloud based server comprising a processor and a memory coupled thereto and configured to cooperate with the controllers of the plurality of sensor devices to provide at least one user interface associated with the alignment data for the plurality of sensor devices, the at least one user interface permitting users to review the alignment data, set up alignment data collection frequency, administer thresholds for determining out of bounds conditions of the alignment data, commission and decommission sensor devices, group sensor devices into logical groups, administer access for different users, and associate business data with each sensor device.

2. The antenna monitoring system according to claim 1 wherein the controller is configured to periodically send the alignment data.

3. The antenna monitoring system according to claim 1 wherein the controller is configured to process the alignment data and send a misalignment notification based thereon.

4. The antenna monitoring system according to claim 1 wherein the cloud based server is configured to process the alignment data and send a misalignment notification based thereon via the at least one user interface.

5. The antenna monitoring system according to claim 1 wherein the sensor device comprises at least one other sensor carried by the portable housing; wherein the controller is configured to collect other data from the at least one other sensor; and wherein the cloud based server is configured to provide a user interface associated with the other data for the plurality of sensor devices.

6. The antenna monitoring system according to claim 1 wherein the at least one other sensor comprises at least one of a height sensor, a geolocation sensor, a temperature sensor, a humidity sensor, a light sensor, and a camera.

7. The antenna monitoring system according to claim 1 wherein the at least one alignment sensor comprises at least one of a tilt sensor, a roll sensor, and an azimuth sensor.

8. The antenna monitoring system according to claim 1 wherein the at least one alignment sensor comprises at least one of an accelerometer, a microelectromechanical (MEMS) accelerometer, an optical azimuth sensor, a magnetometer, and a gyroscope.

9. The antenna monitoring system according to claim 1 wherein the sensor device comprises a battery carried by the portable housing and configured to power the at least one alignment sensor, the cellular telephone transceiver, and the controller.

10. The antenna monitoring system according to claim 1 wherein the sensor device comprises a supercapacitor circuit carried by the portable housing and configured to be charged by ambient RF power to thereby power the at least one alignment sensor, the cellular telephone transceiver, and the controller.

11. A sensor device for a directional antenna comprising:
a portable housing to be mounted on the directional antenna at a respective geographic antenna site from among a plurality of geographically spaced-apart antenna sites;
at least one alignment sensor carried by the portable housing and configured to sense alignment of the directional antenna at the respective geographic antenna site;
a cellular telephone transceiver carried by the portable housing; and
a controller carried by the portable housing, and configured to collect alignment data from the at least one alignment sensor, and communicate with a cloud based server remote from the plurality of geographically spaced-apart antenna sites via the cellular telephone transceiver so that the cloud based server cooperates with the controllers of the plurality of sensor devices to provide at least one user interface associated with the alignment data, the at least one user interface permitting users to review collected alignment data, set up alignment data collection frequency, administer thresholds for determining out of bounds conditions of the alignment data, commission and decommission sensor devices, group sensor devices into logical groups, administer access for different users, and associate business data with each sensor device.

12. The sensor device according to claim 11 wherein the controller is configured to periodically send the alignment data.

13. The sensor device according to claim 11 wherein the controller is configured to process the alignment data and send a misalignment notification based thereon.

14. The sensor device according to claim 11 wherein the sensor device comprises at least one other sensor carried by the portable housing; wherein the controller is configured to collect and send other data from the at least one other sensor to the cloud based server.

15. The sensor device according to claim 14 wherein the at least one other sensor comprises at least one of a height sensor, a geolocation sensor, a temperature sensor, a humidity sensor, a light sensor, and a camera.

16. The sensor device according to claim 11 wherein the at least one alignment sensor comprises at least one of a tilt sensor, a roll sensor, and an azimuth sensor.

17. The sensor device according to claim 11 wherein the at least one alignment sensor comprises at least one of an accelerometer, a microelectromechanical (MEMS) accelerometer, an optical azimuth sensor, a magnetometer, and a gyroscope.

18. The sensor device according to claim 11 further comprising a battery carried by the portable housing and configured to power the at least one alignment sensor, the cellular telephone transceiver, and the controller.

19. The sensor device according to claim 11 further comprising a supercapacitor circuit carried by the portable housing and configured to be charged by ambient RF power to thereby power the at least one alignment sensor, the cellular telephone transceiver, and the controller.

20. A method for monitoring a plurality of directional antennas at a plurality of geographically spaced-apart antenna sites, the method comprising:
operating a plurality of sensor devices, each sensor device comprising
a portable housing mounted on a respective directional antenna at a respective geographic antenna site,
at least one alignment sensor carried by the portable housing and configured to sense alignment of the respective directional antenna at the respective geographic antenna site,
a cellular telephone transceiver carried by the portable housing, and
a controller carried by the portable housing, and configured to collect alignment data from the at least one alignment sensor, and communicate with a cloud based server remote from the plurality of geographically spaced-apart antenna sites via the cellular telephone transceiver; and
operating the cloud based server comprising a processor and a memory coupled thereto to cooperate with the controllers of the plurality of sensor devices to provide at least one user interface associated with the alignment data for the plurality of sensor devices, the at least one user interface permitting users to review collected alignment data, set up alignment data collection frequency, administer thresholds for determining out of bounds conditions of the alignment data, commission and decommission sensor devices, group sensor devices into logical groups, administer access for different users, and associate business data with each sensor device.

21. The method according to claim 20 wherein the controller is configured to periodically send the alignment data.

22. The method according to claim 20 wherein the controller is configured to process the alignment data and send a misalignment notification based thereon.

23. The method according to claim 20 wherein the cloud based server processes the alignment data and sends a misalignment notification based thereon via the at least one user interface.

24. The method according to claim 20 wherein the at least one alignment sensor comprises at least one of a tilt sensor, a roll sensor, and an azimuth sensor.

25. An antenna monitoring system for a plurality of directional antennas at a plurality of geographically spaced-apart antenna sites, the antenna monitoring system comprising:
a cloud based server remote from the plurality of geographically spaced-apart antenna sites; and a plurality of sensor devices, each sensor device comprising
- a portable housing to be mounted on a respective directional antenna at a respective geographic antenna site,
- at least one alignment sensor carried by the portable housing and configured to sense alignment of the respective directional antenna at the respective geographic antenna site,
- a cellular telephone transceiver carried by the portable housing, and
- a controller carried by the portable housing, and configured to collect alignment data from the at least one alignment sensor, and communicate with the cloud based server remote from the respective geographic antenna site via the cellular telephone transceiver;

the cloud based server comprising a processor and a memory coupled thereto and configured to cooperate with the controllers of the plurality of sensor devices to provide at least one user interface associated with the alignment data for the plurality of sensor devices, the at least one user interface permitting users to review the alignment data, set up alignment data collection frequency, administer thresholds for determining out of bounds conditions of the alignment data, and commission and decommission sensor devices.

26. The antenna monitoring system according to claim 25 wherein the controller is configured to periodically send the alignment data.

27. The antenna monitoring system according to claim 25 wherein the controller is configured to process the alignment data and send a misalignment notification based thereon.

28. The antenna monitoring system according to claim 25 wherein the cloud based server is configured to process the alignment data and send a misalignment notification based thereon via the at least one user interface.

29. The antenna monitoring system according to claim 25 wherein the sensor device comprises at least one other sensor carried by the portable housing; wherein the controller is configured to collect other data from the at least one other sensor; and wherein the cloud based server is configured to provide a user interface associated with the other data for the plurality of sensor devices.

30. The antenna monitoring system according to claim 25 wherein the at least one other sensor comprises at least one of a height sensor, a geolocation sensor, a temperature sensor, a humidity sensor, a light sensor, and a camera.

31. The antenna monitoring system according to claim 25 wherein the at least one alignment sensor comprises at least one of a tilt sensor, a roll sensor, and an azimuth sensor.

* * * * *